Oct. 22, 1963
L. HEINOO
3,108,264
BEARING WEAR SENSOR
Filed July 8, 1957
3 Sheets-Sheet 1
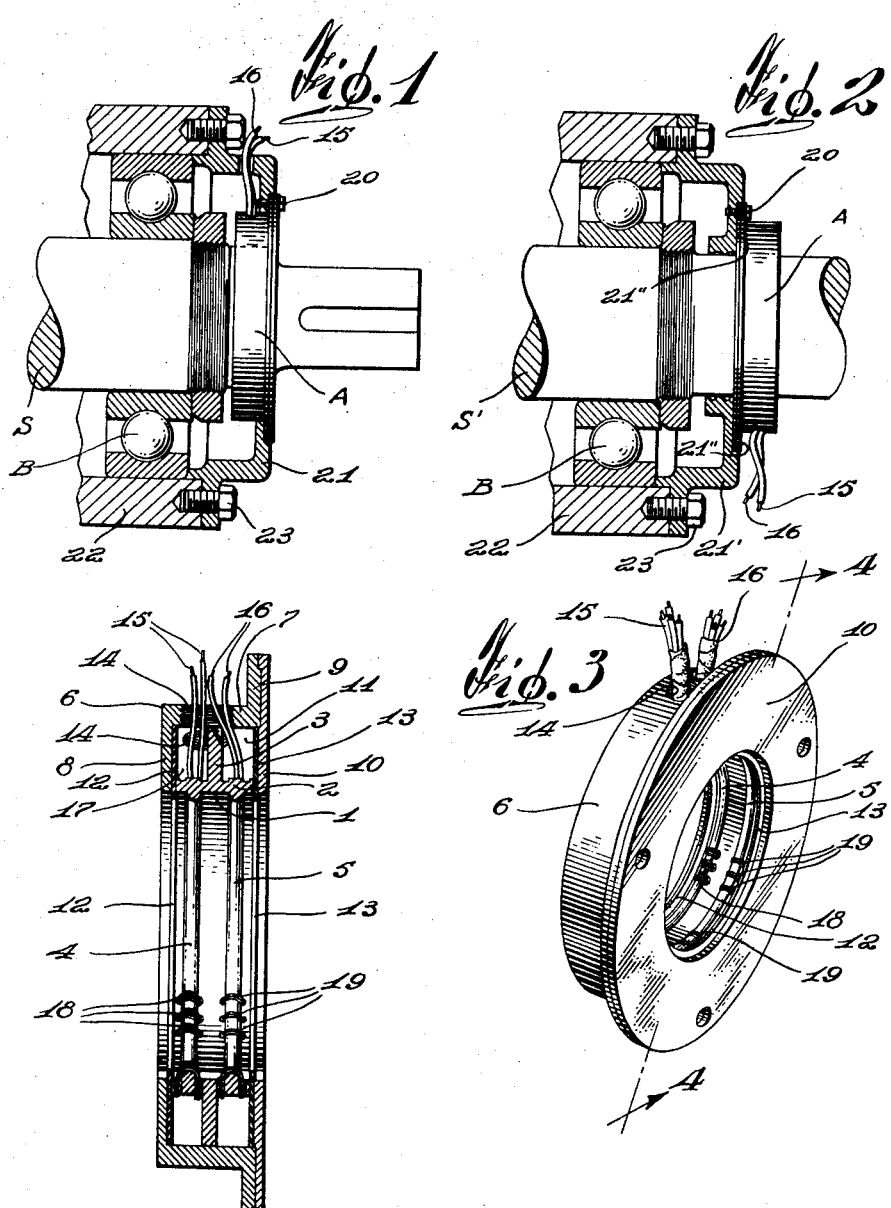
INVENTOR
Lauri HEINOO
BY
ATTORNEYS

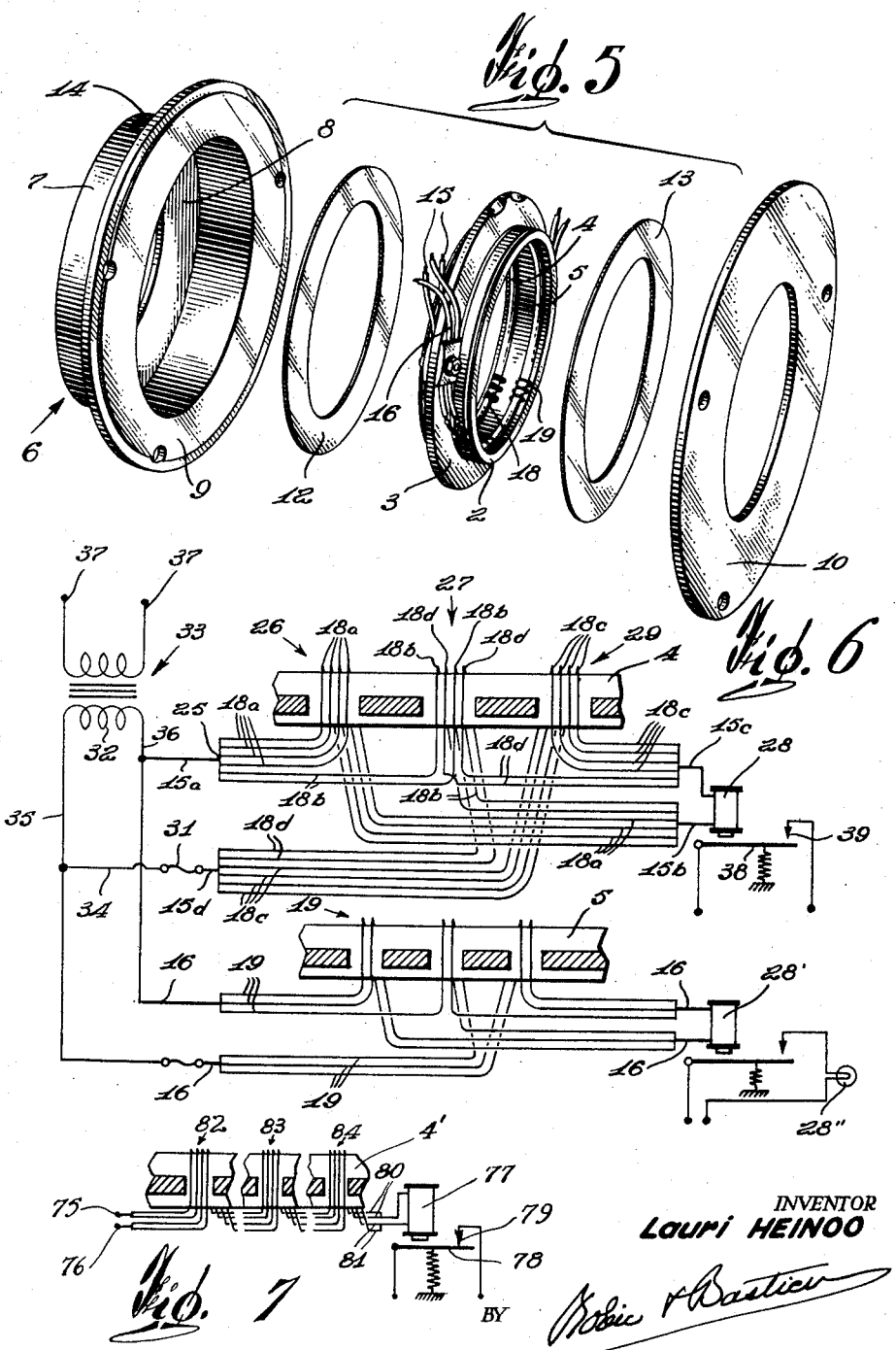

Oct. 22, 1963 L. HEINOO 3,108,264
BEARING WEAR SENSOR
Filed July 8, 1957 3 Sheets-Sheet 3
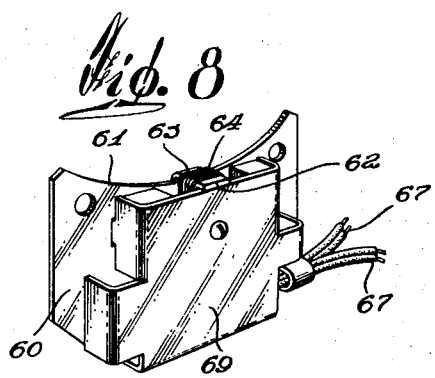
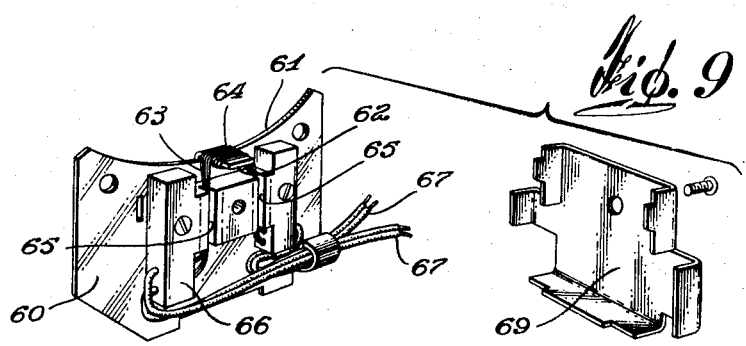
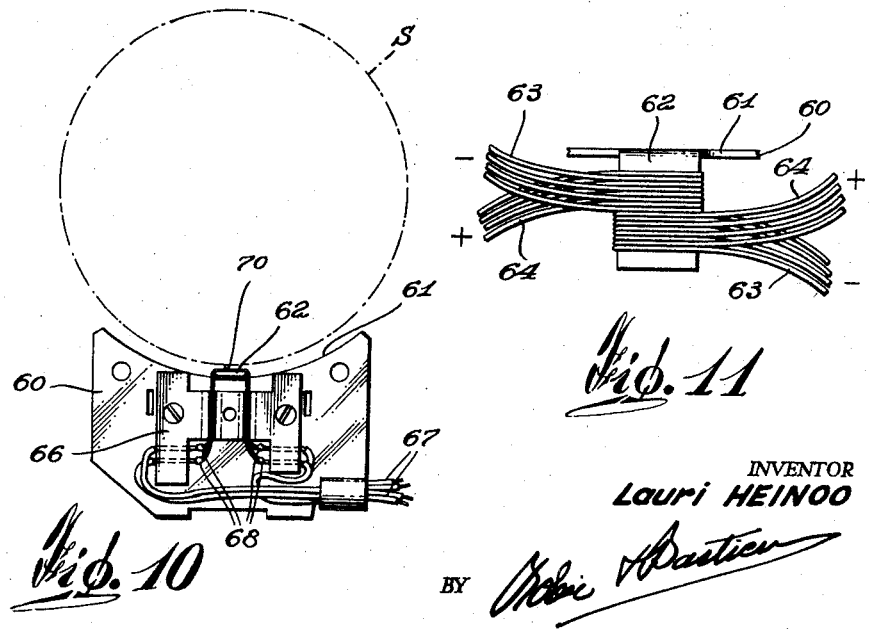
INVENTOR
Lauri HEINOO
BY
ATTORNEYS

United States Patent Office 3,108,264
Patented Oct. 22, 1963

3,108,264
BEARING WEAR SENSOR
Lauri Heinoo, 114 Regina St., Arvida, Quebec, Canada
Filed July 8, 1957, Ser. No. 670,480
1 Claim. (Cl. 340—269)

The present invention relates to a device which monitors the condition of a bearing and which is applicable to all types of machines embodying a rotatable shaft journalled in a bearing.

Machines of the above mentioned type often have costly breakdowns due to their bearings wear out. For the safe and economical operation of such machines, it is necessary to know the condition of their bearings from time to time, as the shafts of said machines must be maintained in a very accurate position. The conventional method of inspecting bearings requires dismantling of the machines and, if the bearings show signs of wear they are normally renewed with the result that only part of the life expectancy is used. If the inspection is not carried out until the bearings are almost worn out, often costly damages have already been caused.

Generally speaking, bearing replacement constitutes an important part of the maintainance and upkeep of machinery and, therefore, if the entire period of service of the bearings is utilized, considerable monetary saving is a result.

In Canadian Patent No. 516,658 dated September 20, 1955 by the same applicant, a bearing condition detector has been described for indicating the condition of bearings. Said detector comprises an electromagnet having both faces cooperable with and spaced from the shaft of the machine, said shaft completing the magnetic circuit of the electromagnet through the air gap between the pole faces of said magnet and said shaft. The position of the shaft with respect to the magnet corresponds to a predetermined air gap and, therefore, determines the magnetic reluctance of the magnetic circuit. A constant A.C. voltage is applied to the coil of the electromagnet and the resulting current is a function of the magnetic leakage flux, and consequently provides an indication of the axial position of the shaft with respect to the electromagnet. In such a device, very small currents are involved and variations of the position of the shaft result only in very small variations of said current, therefore, the current variations have to be amplified by electronic amplifiers in order to obtain a current indication having sufficient power for operating an alarm system or a switching arrangement for stopping the machine when the bearings thereof have reached a dangerous condition.

Therefore, the general object of the present invention is the provision of a bearing safety device which will monitor the condition of machinery bearings at all times so that such bearings may remain in service for their entire period of service expectancy.

Another important object of the present invention is the provision of a safety device of the character described which is an improvement over the electromagnetic bearing condition detector described and claimed in Canadian Patent No. 516,658 above noted, in that the monitoring current involved is large enough to operate directly a suitable alarm system or machinery switching off circuit without interposition of electronic amplifiers and the like.

Yet another important object of the present invention is the provision of a safety device of the character described which is so arranged that, for a predetermined state of wear of the bearings, it will give an alarm signal and thereafter, for a more pronounced condition of wear of the bearings, it will operate a circuit to close off the operation of the machinery with which the safety device is associated.

Yet another important object of the present invention is the provision of a safety device of the character described which is very simple and inexpensive to manufacture and which will be very reliable in service.

The bearing safety device, according to the present invention is characterized by disposing at a very short distance from a shaft, the bearings of which are to be monitored, a portion of an electric alarm and/or control circuit, said shaft gradually approaching said circuit portion with wear of said bearings until said shaft finally contacts said portion when the bearings have attained sufficient wear, to cause a change in the state of said electric circuit thereby giving an indication of said wear.

According to preferred embodiments, said circuit portion consists of parts of the go and return conductors of a normally closed alarm and/or control circuit, contact of said shaft with said parts causing either opening of said circuit or short-circuiting of the alarm or control device of said circuit.

The foregoing and other important objects of the present invention will become more apparent during the following disclosure and by referring to the drawings in which:

FIGURE 1 is a longitudinal section of a bearing and shaft arrangement provided with a first embodiment of the bearing safety device in accordance with the present invention;

FIGURE 2 is a similar longitudinal section showing the same first embodiment of the safety device in another position when associated with a through shaft;

FIGURE 3 is a perspective view of the first embodiment;

FIGURE 4 is a section along line 4—4 of FIGURE 3;

FIGURE 5 is an exploded perspective view of the safety device;

FIGURE 6 is a diagrammatic electric circuit of the first embodiment of the safety device;

FIGURE 7 is a diagrammatic electric circuit of a modified arrangement;

FIGURE 8 is a perspective view of a second embodiment;

FIGURE 9 is an exploded perspective view of the second embodiment;

FIGURE 10 is a front elevation of the second embodiment with the cover removed; and FIGURE 11 is a plan view of the wiring arrangement of the second embodiment.

Referring now more particularly to the drawings in which like reference characters indicate like elements throughout, the safety device, according to the first embodiment, is shown in FIGURES 1 to 6 inclusive, and comprises an annular member 1 made of metal or of electric insulating material, and of T-shaped cross-section providing a cylindrical portion 2 and a radially outwardly extending flange 3 depending from the middle of the cylindrical portion 2. The annular member 1 is provided along the cylindrical internal surface of the cylindrical portion 2 with two spaced radially inwardly extending ribs 4 and 5 of substantially semi-circular cross-section. An annular cover member, generally indicated at 6, is adapted to fit over the annular member 1. Said cover member 6 comprises a cylindrical portion 7 adapted to fit over and abut the outer edge of the flange 3, and at one end of said cylindrical portion 7, a radially inwardly extending flange 8 adapted to abut one end of the cylindrical portion 2 and at the other end of said cylindrical portion 7, a radially outwardly extending annular flange 9. The outer radial surface of the flange 9 is substantially flush with the other end of the cylindrical portion 2 of the inner annular member 1. An annular cover member 10 in the form of a flat ring is adapted to abut the aligned outer radial surface of the flange 9 and outer edge of the porton 2 so as to close the chamber 11 defined by the cylindrical portions 2 and 7 and flange 3. Preferably, flat rings 12 and 13 of insulating material are disposed between the ends of the cylindrical portion 2 and the flange 8 and the ring cover member 10, respectively, and are adapted to line the inside surfaces of said flange 8 and ring cover member 10. The cover member 6 is provided with openings 14 for the passage of two sets of electrical wires 15 and 16 which enter the annular chambers 11 and 17, respectively, disposed on each side of the central radial flange 3 and are connected to the sets of contact wires 18 and 19, respectively, which pass through holes made in the cylindrical portion 2 and extend around the respective ribs 4 and 5 in three groups of three closely spaced bunches, said groups being equally spaced around the periphery of the ribs 4 and 5. The electrical connections and arrangement of the wires 18 and 19 will be described hereinafter.

The bearing safety device, just described, may be mounted in the manners shown in FIGURE 1 or 2. Referring to FIGURE 1, the safety device is fitted around the shaft S in order to monitor the condition of the bearing B. The safety device, indicated at A, is mounted with its outer flange 9 and cover 10 secured by means of bolts 20 to an apertured cap 21 which is secured to the machine housing 22 by means of bolts 23. The cylindrical portion 7 of the safety device A extends through and has a tight fit with the aperture made in the cap 21 and fits around the shaft S and so as to be coaxial therewith. The shaft S may be of the type terminating within the cap 21.

When the shaft S' is of the through type, as shown in FIGURE 2, the safety device A may be secured to the cap 21' with the main part thereof extending outwardly. The device A is located axially of the shaft S' by fitting within a circular recess 21" made in cap 21'.

FIGURE 6 shows schematically the electrical connections of the wiring of the safety device. In said figure, the ribs 4 and 5 have been shown straight for clarity, although they are annular, as described hereinabove. The wires 18 and 19 extending around the ribs 4 and 5 are disposed, as mentioned hereinabove, in three groups, each group consisting of three bunches of said wires. In FIGURE 6 there is shown one such group of wires 18 surrounding the rib 4 and one group of wires 19 surrounding the rib 5.

Referring to the wires 18, six of said wires are connected at 25 to a lead wire 15a. Four of said wires, namely, wires 18a, pass around the rib 4 in a first bunch to form a first contact station, as shown at 26, said wires 18a are then connected to a common lead wire 15b. The remaining wires 18b pass around the rib 4 at a second contact station 27 and then are connected to the common lead wire 15b. The lead wire 15b issues from the safety device A and is connected to a holding coil 28. The other end of the coil 28 is connected to a common lead wire 15c for four wires 18c which pass around the rib 4 at a third contact station 29 and then are connected to a common lead wire 15d which issues from the safety device A. The two remaining wires 18d connected to the holding coil 28 by lead wire 15c, pass around the rib 4 at the second contact station 27 and are alternately disposed with respect to the wires 18b at said second contact station. The remaining wires 18d are then connected at their other end to the common lead wire 15d. The lead wires 15a and 15d are connected with the interposition of a fuse 31 in series with the secondary 32 of a step-down transformer 33 through the leads 34 and 35 and 36. The primary of transformer 33 is connected to an A.C. motor feed line voltage at 37 of 550 volts, for example. If D.C. is used a transformer is not needed.

From the foregoing it will be seen that the secondary 32 of the step-down transformer 33 feeds current at 220 volts, for example, to the holding coil 28 through the following circuits: (a) secondary 32, wires 18a at the first contact station 26, coil 28, wires 18c at the third contact station 29 and secondary 32; (b) in a parallel path, secondary 32, wires 18b surrounding said second contact station 27 and then to the secondary 32 of the step-down transformer 33.

Although in FIGURE 6 only one group of three bunches forming the stations 26, 27 and 29 have been represented for simplicity and clearness of the description, it is understood that there are three or more such groups disposed around the periphery of the rib 4. The wires forming the respective contact stations in each group are connected in series. The wires 18 each consist of a single strand of copper wire of about 0.009" in diameter covered with a thin varnish insulation. The inside diameter of the rib 4 is only slightly greater than the external diameter of the shaft portion enclosed by the safety device A, so as to leave, for instance, a gap of 0.014" between said rib and the shaft, and consequently a gap of about 0.005" between the wires 18 at the contact stations 26, 27 and 29 and the cylindrical surface of the shaft portion. When the shaft is out of contact with the wires 18, the circuit is closed and energizes the holding coil 28 which maintains the electrical contacts 38 and 39 in closed position. Said contacts and holding coil are a diagrammatic illustration of a motor starting magnetic switch and may comprise three pairs of contacts 38, 39. The coil 28 may also control a circuit suitable for controlling any type of machine with which the bearing safety device A is associated. When the bearing B has attained a predetermined "dangerous" condition of wear, the shaft S has moved radially a certain distance with respect to its intended running position, sufficient to rub and wear down the insulation of the wires 18, thereby short-circuiting the holding coil 28 which in turn allows the opening of the contacts 38 and 39 resulting in the stoppage of the machine. If the shaft is dirty or otherwise non-conducting and does not make electrical contact with the wires 18, continued friction between the shaft and the wires will finally cause breakage or snapping of said wires, thereby deenergizing the holding coil 28.

The short circuiting of the coil 28 may be effected by the shaft S contacting the first wires 18a at station 26 simultaneously with the wires 18c at station 29 in one and the same group or of any one group with any other groups of the three groups around the periphery of the safety device. Short circuiting of the coil 28 may also be effected by the shaft S contacting the wires 18b and 18d at station 27, said short circuiting resulting in the burning out of the fuse 31.

The wires 19 disposed around the rib 5, shown at the lower portion of FIGURE 6, has the exact same arrangement as the wires 18 associated with the rib 4, except that each bunch is comprised of only two wires instead of four and said wires have a greater diameter than the wires 18; for instance, the wires 19 have a diameter of 0.011". The ribs 4 and 5 are spaced an equal distance from the shaft S and, therefore, the greater diameter wires 19 will be adapted to make electrical contact with the shaft at an instant prior to the establishing of electrical contact between the wires 18 and the shaft. This instant will correspond to a state of wear on the bearing indicating it should be replaced. Upon short circuiting of the holding coil 28', the normally "on" signal light 28" will be extinguished, thereby giving a signal that the bearing B is in a condition requiring replacement. An audible signal may be also associated with the holding coil 28', the circuit of which will be closed upon deenergizing of coil 28'.

Therefore, the safety device, according to the present invention, provides two indications: a first indication that the bearing has reached a worn state and is ready to be replaced, and, if such an indication is not heeded, a second indication, operates when the bearing has reached a danger condition which provides for the automatic shut down of the machine. Therefore, the device in accordance with the present invention, is entirely foolproof and will prevent breakdown of the machine by stopping the same should there be any oversight in the inspection of said machine.

FIGURE 7 illustrates a modified arrangement of the wiring of FIGURE 6.

The terminals 75 and 76 are connected to a source of electricity, which may be D.C. or A.C., at any suitable potential such as 110 v., 220 v. or 440 v. The terminals 75 and 76 are connected to the holding coil 77 of a magnetic switch having contacts 78, 79, through thinly insulated small gauge wires 80 and 81. The wires 80 and 81 are bunched together and are pressed around rib 4' at a plurality of contact stations 82, 83, 84 disposed around the inner periphery of rib 4'. The contacts 78, 79 may be an electric motor starting switch or part of an electric circuit for the starting and stopping of all types of machinery, the bearings of which are to be monitored.

As in FIGURE 6, wear of the bearings causes the shaft to gradually approach and finally contact with the wires 80, 81 at at least one of the stations 82, 83, 84. If the shaft makes electrical contact with the wires 80 and 81, the coil 77 is short-circuited; if not, the shaft finally causes snapping of said wires and deenergizing of coil 77. In the two cases, stoppage of the machinery occurs.

The same rib 4', or another axially spaced rib, may be provided with small gauge wires of slightly greater diameter than the diameter of wires 80, 81 to provide a signal, as explained hereinabove.

The embodiment just described is operative irrespective of the radial direction in which the wear of the bearing takes place. It may, therefore, be installed on machinery the final utilization of which is not known in advance. More particularly, with such embodiment, it is not necessary to know the radial direction of the main thrust exerted by the shaft on the bearing. On the other hand, said embodiment has to be fitted over the shaft and there are certain applications where this is not possible. Accordingly, the embodiment shown in FIGURES 8 to 11 inclusive is of the type which does not surround the shaft to be monitored and is, therefore, applicable to shaft arrangements wherein it is not possible to fit a sleeve-like element around the shaft. However, when using the last embodiment to be described hereinafter, it is necessary to know in advance in which radial direction the main wear of the bearing will take place, so as to be able to fit the safety device in said radial direction.

In FIGURES 8 to 11, a metal plate 60 is provided at the centre part of its curved edge 61 with a right-angularly bent lip 62. Varnish coated wires 63 are wound one turn around the lip 62 and are alternately disposed with respect to a second group of varnish coated wires 64 of equal diameter. The wires 63 and 64 are inserted into grooves 65 of an insulating block 66 which is secured to the plate 60. The outer ends of each group of wires 63 and 64 are connected to common leads 67, as shown at 68 in FIGURE 10. These connections 68 and the wires 63, 64 together with the insulating block 66, is protected by a metal cover 69 adapted to be secured to the plate 60. The plate 60 is mounted at any suitable location within the machine and secured to the machine housing such as to leave the desired gap 70 between the shaft S and the wire windings on the lip 62. The gap 70 is chosen such that, as the bearing for the shaft S gradually wears down, said shaft S will approach and finally rub the insulating layer on the adjacent wires 63 and 64 to thereby close the electric circuit between the wires through shaft S. The initial gap 70 is chosen such that said electrical circuit will be closed when the bearing has attained a condition requiring replacement. The wires 63 and 64 are connected to a suitable electrical circuit, similar to the circuit shown in FIGURE 6, in connection with the first embodiment described hereinabove. For instance, the wires 64 will be connected between one pole of the secondary 32 of the step-down transformer 33, shown in FIGURE 6, and one pole of a holding coil for an alarm or signalling circuit, such as holding coil 28' of FIGURE 6. The wires 63 will constitute the return path and will be connected between the other pole of the secondary of the step-down transformer and the other pole of the holding coil. Upon electrical connection being established between the adjacent wires 63 and 64 on the lip 62 through the shaft S, or upon breakage of said wires by the shaft rubbing thereon, the holding coil will be deenergized, thereby actuating the alarm circuit.

If desired, two groups of wires 63 and 64 may be mounted on the lip 62, the wires of one group having a larger diameter than the other group of wires. The group of wires having the larger diameter will be connected to an alarm circuit, while the group of wires having the smaller diameter will be connected to a control circuit for stopping the machine associated with the safety device, in a manner such as described with the first embodiment.

While preferred embodiments according to the present invention have been illustrated and described, it is understood that various modifications may be resorted to without departing from the spirit and scope of the appended claim.

I claim:

A bearing wear monitoring device for providing an indication of the state of wear of a bearing in which a shaft is journalled, said device comprising: a stationary substantially arcuate member having a radially projecting portion adapted to stand close to said shaft and to provide a gap therebetween; a plurality of small diameter thinly insulated wires having a part thereof lying over said arcuate portion in contact therewith and in close proximity to one another and to said shaft, a normally energized holding coil; said wires and holding coil being parts of a normally closed electrical series circuit with one end of some of said wires being connected to one end of said holding coil and one end of the remaining wires being connected to the other end of said holding coil, said shaft having means thereon to abrade and cut said wires, whereby as said bearing is worn a predetermined amount, the shaft first rubs the insulation off said wires and if no electrical contact is made between said wires, through said shaft, to shortcircuit the holding coil, the shaft will continue to rub the wires until they are severed and said circuit is opened, to thus provide an indication that said bearing has reached a predetermined state of wear.

References Cited in the file of this patent

UNITED STATES PATENTS

| 449,411 | Hannah | Mar. 31, 1891 |
| 666,831 | Watson | Jan. 29, 1901 |
| 2,731,619 | Fratus | Jan. 17, 1956 |
| 2,794,136 | Kalikaw | May 28, 1957 |
| 2,814,684 | De Pascale | Nov. 26, 1957 |
| 2,853,569 | Neaverson | Sept. 23, 1958 |

FOREIGN PATENTS

| 88,470 | Austria | May 26, 1922 |
| 148,914 | Austria | Mar. 10, 1937 |